US009381602B2

(12) United States Patent
Holmes et al.

(10) Patent No.: US 9,381,602 B2
(45) Date of Patent: Jul. 5, 2016

(54) TURBOMACHINE BUCKET DISPLACEMENT APPARATUS AND METHOD OF USE

(71) Applicant: General Electric Company, Schenectady, NY (US)

(72) Inventors: James Bradford Holmes, Fountain Inn, SC (US); James Robert Hollis, Greenville, SC (US); David Randolph Spracher, Simpsonville, SC (US); Wayne David Sullivan, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 184 days.

(21) Appl. No.: 14/277,222

(22) Filed: May 14, 2014

(65) Prior Publication Data

US 2015/0328728 A1     Nov. 19, 2015

(51) Int. Cl.
*B23P 19/027* (2006.01)
*B23P 19/04* (2006.01)
*B23P 15/02* (2006.01)
*F01D 5/00* (2006.01)
*F01D 5/30* (2006.01)
*F01D 25/28* (2006.01)

(52) U.S. Cl.
CPC .............. *B23P 19/027* (2013.01); *B23P 15/02* (2013.01); *B23P 19/04* (2013.01); *F01D 5/005* (2013.01); *F01D 5/3007* (2013.01); *F01D 25/285* (2013.01); *Y10T 29/4932* (2015.01); *Y10T 29/53983* (2015.01)

(58) Field of Classification Search
CPC ...................... Y10T 29/53983; Y10T 29/5383; B23P 19/006; B23P 19/027; B23P 6/002; B23P 15/02; F01D 5/005; F01D 5/3007; F01D 25/205

See application file for complete search history.

(56) References Cited

U.S. PATENT DOCUMENTS

| 1,777,616 | A | * | 10/1930 | Hommel | ................. B23Q 3/00 29/252 |
| 2,617,181 | A | * | 11/1952 | D'Haem | ............... B25B 27/026 29/252 |
| 3,044,157 | A | * | 7/1962 | Fink | ....................... H01B 17/58 29/235 |
| 3,149,537 | A | * | 9/1964 | Fink | .................... F15B 15/1409 137/625.69 |

(Continued)

FOREIGN PATENT DOCUMENTS

| DE | 10344098 A1 | 4/2005 |
| EP | 1614856 A1 | 1/2006 |

(Continued)

OTHER PUBLICATIONS

European Search Report and Opinion issued in connection with corresponding EP Application No. 15167321.7 on Oct. 9, 2015.

*Primary Examiner* — Jason L Vaughan
(74) *Attorney, Agent, or Firm* — Ernest G. Cusick; Hoffman Warnick LLC

(57) ABSTRACT

Various embodiments include apparatuses adapted to displace turbomachine components from a location within a turbomachine. In some embodiments apparatuses for displacing a turbine bucket from a turbomachine wheel slot include a body having at least two contacting portions for contacting the turbomachine wheel, a linear actuator coupled to the body, and an engagement arm for engaging the turbine bucket, the engagement arm coupled to the linear actuator and adapted to be actuated in a first axial direction by the linear actuator.

8 Claims, 5 Drawing Sheets

(56) References Cited

U.S. PATENT DOCUMENTS

| | | | | |
|---|---|---|---|---|
| 3,703,030 | A | * | 11/1972 | Simms .................. E04G 21/121 254/29 A |
| 4,265,595 | A | * | 5/1981 | Bucy, Jr. ............... F01D 5/3007 416/220 R |
| 4,455,730 | A | | 6/1984 | Guenther |
| 4,485,542 | A | * | 12/1984 | Vasoll .................. B23P 19/084 29/252 |
| 4,704,780 | A | * | 11/1987 | Moffett ................ B25B 27/026 29/252 |
| 5,129,133 | A | * | 7/1992 | Reesor ................. B25B 27/026 29/252 |
| 5,329,693 | A | * | 7/1994 | Smith ................... H01R 43/26 29/252 |
| 5,701,649 | A | * | 12/1997 | Reesor ................. B25B 27/023 29/252 |
| 5,836,078 | A | * | 11/1998 | Aiken ................... B25B 27/064 29/251 |
| 5,966,793 | A | * | 10/1999 | Pyron .................... B25B 27/02 29/252 |
| 6,571,471 | B2 | | 6/2003 | Hohmann |
| 7,128,537 | B2 | | 10/2006 | Anner et al. |
| 7,455,505 | B2 | | 11/2008 | Hartmann et al. |
| 2002/0085917 | A1 | | 7/2002 | Roberts et al. |

FOREIGN PATENT DOCUMENTS

| | | |
|---|---|---|
| EP | 2733307 A1 | 5/2014 |
| WO | 2005054631 A1 | 6/2005 |
| WO | 2012167824 A1 | 12/2012 |
| WO | 2014075894 A1 | 5/2014 |

\* cited by examiner

TURBOMACHINE BUCKET DISPLACEMENT APPARATUS AND METHOD OF USE

FIELD OF THE INVENTION

The subject matter disclosed herein relates generally to displacement of turbomachine components from a location within a turbomachine. More specifically, the disclosure provided herein relates to methods and apparatuses for displacing a turbine bucket from a location within a turbomachine spacer wheel.

BACKGROUND OF THE INVENTION

Turbine buckets (e.g., gas turbine buckets) are generally installed on spacer wheels using dove tail-shaped mounting hardware. During operation of gas turbines, the buckets are exposed to high temperature and stresses that may require replacement of buckets. There is therefore, often a need for inspection of gas turbine buckets. Such buckets may be difficult to access and remove from their fittings within spacer disks due to the limited space between turbomachine components.

Conventional techniques for removal of turbomachine components that are installed in dovetail fittings include the use of vibratory tools such as peening guns, slide hammers, hydraulic rams and hammers to exert an axial force on the bucket in order to displace the bucket from its slot. Use of such devices may be cumbersome as configurations of some gas turbines greatly hinder or even prevent access to the area behind the buckets which has traditionally been utilized for removal machine access in order to apply the force, e.g., at the dovetail base, necessary to remove buckets. As discussed, displacement and/or removal of buckets using conventional tools is difficult due to a lack of free space between turbomachine components. Furthermore, such techniques may cause damage to the buckets during removal, as the hammer or other device used may deform or crack the material of the bucket.

BRIEF DESCRIPTION OF THE INVENTION

Various embodiments include apparatuses adapted to displace turbomachine components from a location within a turbomachine. In some embodiments apparatuses for displacing a turbine bucket (e.g., gas turbine bucket) from a turbomachine wheel slot include a body having at least two contacting portions for contacting the turbomachine wheel, a linear actuator coupled to the body, and an engagement arm for engaging the turbine bucket, the engagement arm coupled to the linear actuator and adapted to be actuated in a first axial direction by the linear actuator.

A first aspect provides an apparatus for displacing a turbine bucket from a turbomachine wheel slot, the apparatus comprising: a body having at least two contacting portions for contacting the turbomachine wheel; a linear actuator coupled to the body; and an engagement arm for engaging the turbine bucket, the engagement arm coupled to the linear actuator and adapted to be actuated in a first axial direction by the linear actuator.

A second aspect provides an apparatus for displacing a turbine bucket from a turbomachine wheel slot, the apparatus comprising: a body having at least two contacting portions for contacting the turbomachine wheel, the contacting portions spaced apart at least a distance equal to a distance between adjacent turbomachine wheel slots; a hydraulic ram coupled to the body; and an engagement arm for engaging the turbine bucket, the engagement arm coupled to the hydraulic ram and adapted to be actuated in a first axial direction by the hydraulic ram over a distance equal to at least an axial length of a turbomachine wheel slot A third aspect provides a method of displacing a turbine bucket from a turbomachine wheel slot using a displacement apparatus, the method comprising: detachably engaging an engagement arm of the displacement apparatus to the turbine bucket, the engagement arm attached to a linear actuator coupled to a body of the displacement apparatus, and the engagement arm adapted to be actuated in a first axial direction by the linear actuator; contacting the turbomachine wheel with at least two contacting portions of the body of the displacement apparatus; and displacing the turbine bucket from a position within a slot of the turbomachine wheel in the first axial direction by linearly actuating the engagement arm with the linear actuator.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-4, like numbering may represent like elements. Redundant explanation of these elements has been omitted for clarity. Finally, it is understood that the components of FIGS. 1-4 and their accompanying descriptions may be applied to any embodiment described herein.

DETAILED DESCRIPTION OF THE INVENTION

The subject matter disclosed herein relates generally to displacement of turbomachine components from a location within a turbomachine. More specifically, the disclosure provided herein relates to methods and apparatuses for displacing a gas turbine bucket from a location within a turbomachine spacer wheel.

The apparatuses and methods according to embodiments of the invention are designed to displace buckets from locations within slots in spacer wheels in the various stages of gas turbines. The apparatuses and methods described herein utilize fixtures that interact with features of the turbine wheels and with features on the buckets themselves in order to apply the necessary forces required to displace and/or remove buckets from the turbine wheels. Apparatuses and methods according to embodiments of the invention utilize such fixtures to attach to the bucket and/or the turbomachine wheel to pull the bucket from its dovetail-shaped slot using a linear actuator to apply a displacement force.

According to various embodiments of the invention, apparatuses for displacement of gas turbine buckets may be comprised of several parts. For example, the apparatuses may include a base or body, a linear actuator, which may include a single- or double-acting hydraulic cylinder, at least two locators or contact portions for contacting the spacer wheel from which a gas turbine bucket is to be displaced, an engagement arm actuated by the linear actuator. The apparatus may also include a handle for lifting and manipulating the apparatus. The handle on the top of the fixture may be utilized to lift the fixture into place so the two locators contact the turbine wheel at the lock-wire tangs on either side of the bucket. These locators may also provide the points for the apparatus to react against when displacing the bucket.

As differentiated from conventional apparatuses and methods used for displacement of gas turbine buckets, embodiments described herein are designed to fit into limited spaces and to displace buckets with reduced chance of damage to the turbomachine components being removed, e.g. buckets, or other turbomachine components.

Figure 1:
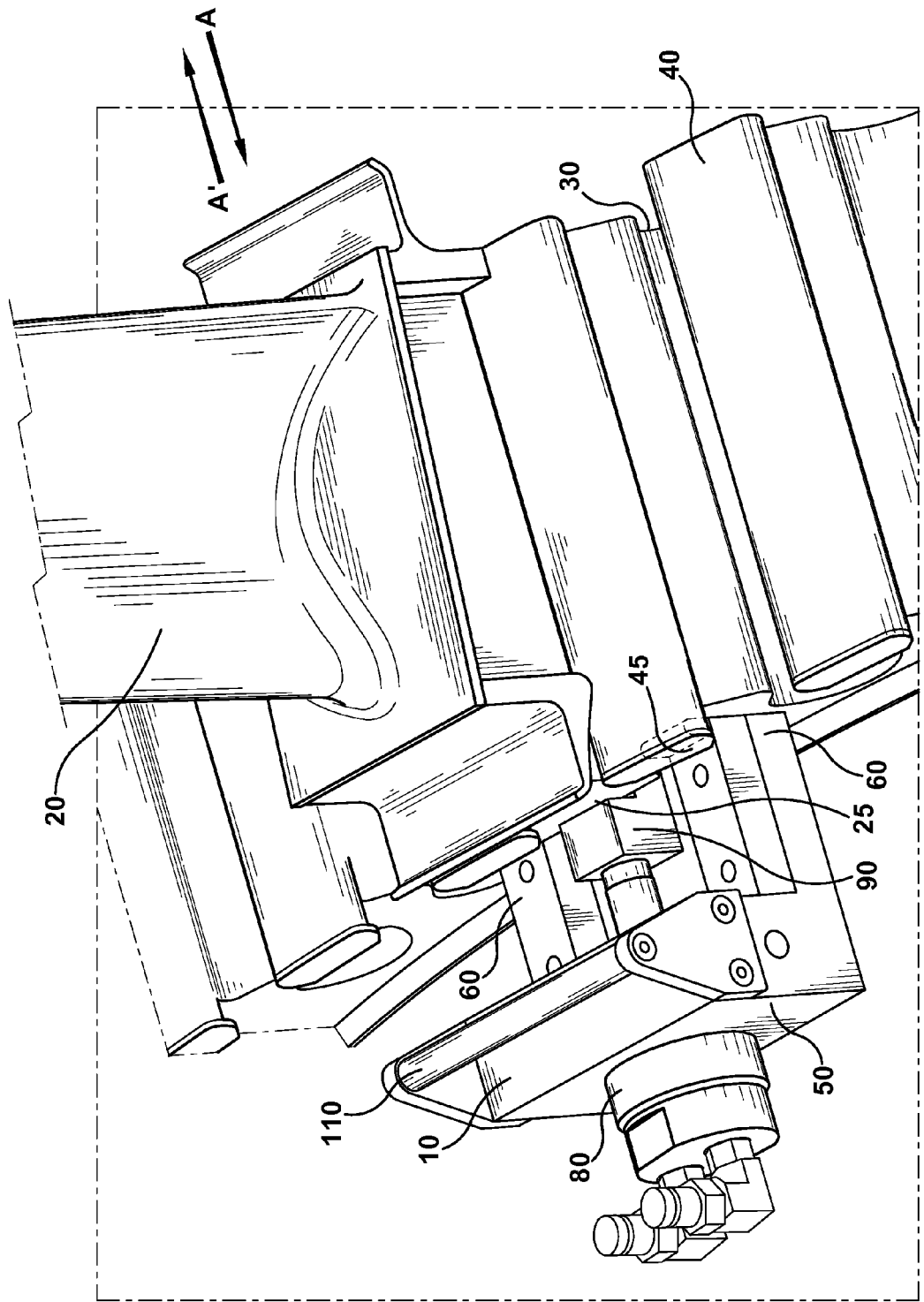
FIG. 1 illustrates a three-dimensional perspective view of an environment for use of an apparatus according to embodiments of the invention.

FIG. 1 illustrates an environment 5 for use of an apparatus 10 for displacing a gas turbine bucket 20 from a wheel slot 30 of a turbomachine wheel 40. Apparatus 10 includes a body 50 having at least two contacting portions 60 for contacting turbomachine wheel 40. Contacting portions 60 of body 50 are used to contact turbomachine wheel 40 to stabilize apparatus 10 during displacement of bucket 20. While two contacting portions 60 are shown, an entire side of body 50 may act as contacting portions 60. Also according to some embodiments, body 50 may include a single contacting portion 60, e.g. for placement below a slot 30 of a wheel 40 from which a bucket 20 is to be removed. Contacting portions 60 may include a material that is selected to reduce the likelihood of damage to turbomachine wheel 40, e.g., a rubber, metal or plastic material. Additionally, contacting portions 60 may include a material that is the same as the material of body 50. According to embodiments, contacting portions 60 may be spaced apart at least a distance D equal to a circumferential or linear distance between adjacent turbomachine wheel slots 30 (distance D illustrated in FIG. 4).

FIG. 1 further shows linear actuator 80 coupled to body 50, along with engagement arm 90 for engaging gas turbine bucket 20. According to embodiments, engagement arm 90 may engage gas turbine bucket lockwire tabs 25. Engagement arm 90 may be coupled to linear actuator 80 by any appropriate, now-known or later-developed coupling mechanism. According to embodiments, engagement arm 90 may be adapted to be linearly actuated in a first axial direction A by linear actuator 80. First axial direction A is coincident with a major axis of linear actuator 80 and substantially parallel to the direction of slot 30, from which bucket 20 is displaced by apparatus 10 during a displacement operation. Linear actuator 80 may include a single-acting, one-way ram including a single-acting hydraulic ram. Linear actuator 80 may include, in some embodiments, a worm screw mechanism or any other now-known or later-developed mechanism for linearly actuating displacement arm 90. Because full displacement of bucket 20 may not occur in a first attempt, that is, bucket 80 may be prevented or hindered from moving within slot 30, linear actuator 80 may include a two-way, double-acting linear actuator for actuating engagement arm 90 in first axial direction A and a second axial direction A'. According to embodiments, a two-way double acting linear actuator may include a double-acting hydraulic ram. According to embodiments where linear actuator 80 is adapted to actuate displacement arm 90 in first and second axial directions A/A', body 50 may include at least two turbomachine wheel engagement portions 100 for engaging turbomachine wheel 40 and for providing a reactive force to apparatus 10 so that apparatus 10 is not simply moved away from bucket 20 as linear actuator 80 actuates displacement arm 90 in second axial direction A'. That is, if apparatus 10 is not at least temporarily engaged with wheel 40, e.g., using wheel engagement portions 100 to receive a reactive force from wheel 40, then apparatus 10 may be moved away from bucket 20 and wheel 40 when arm 90 is actuated in second axial direction A'. According to embodiments, turbomachine wheel engagement portions 100 may be adapted to engage lockwire tabs 45 of turbomachine wheel 40. According to embodiments of the invention, body 50 of apparatus 10 may include a handle 110, as illustrated in FIG. 1.

Figure 2:
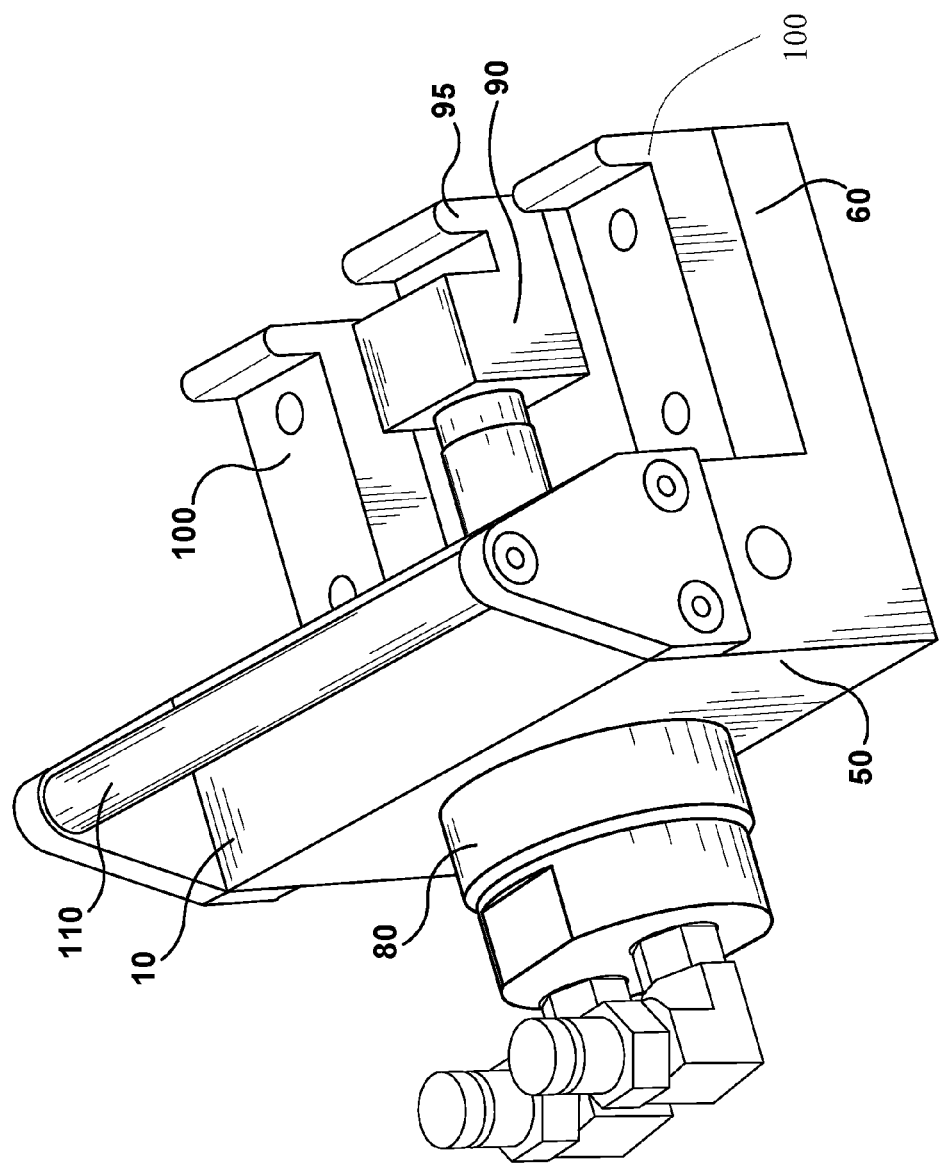
FIG. 2 illustrates a three-dimensional perspective view of an apparatus according to embodiments of the invention.

FIG. 2 illustrates optional embodiments of apparatus 10. According to embodiments, engagement arm 90 may use at least one bucket engagement hook 95 to engage bucket 20, e.g., to engage lockwire tabs 25 of bucket 20. Also according to various embodiments, wheel engagement portions 100 may include hooks 105 for engaging turbomachine wheel 40, e.g., at lockwire tabs 45 of wheel 40. It is understood that according to various embodiments, the hooks 105 can include one or more members for engaging an inner surface of the turbomachine wheel 40 (e.g., at lockwire tabs 45). These engaging members may take any form capable of engaging the turbomachine wheel 40 as described herein.

Figure 3:
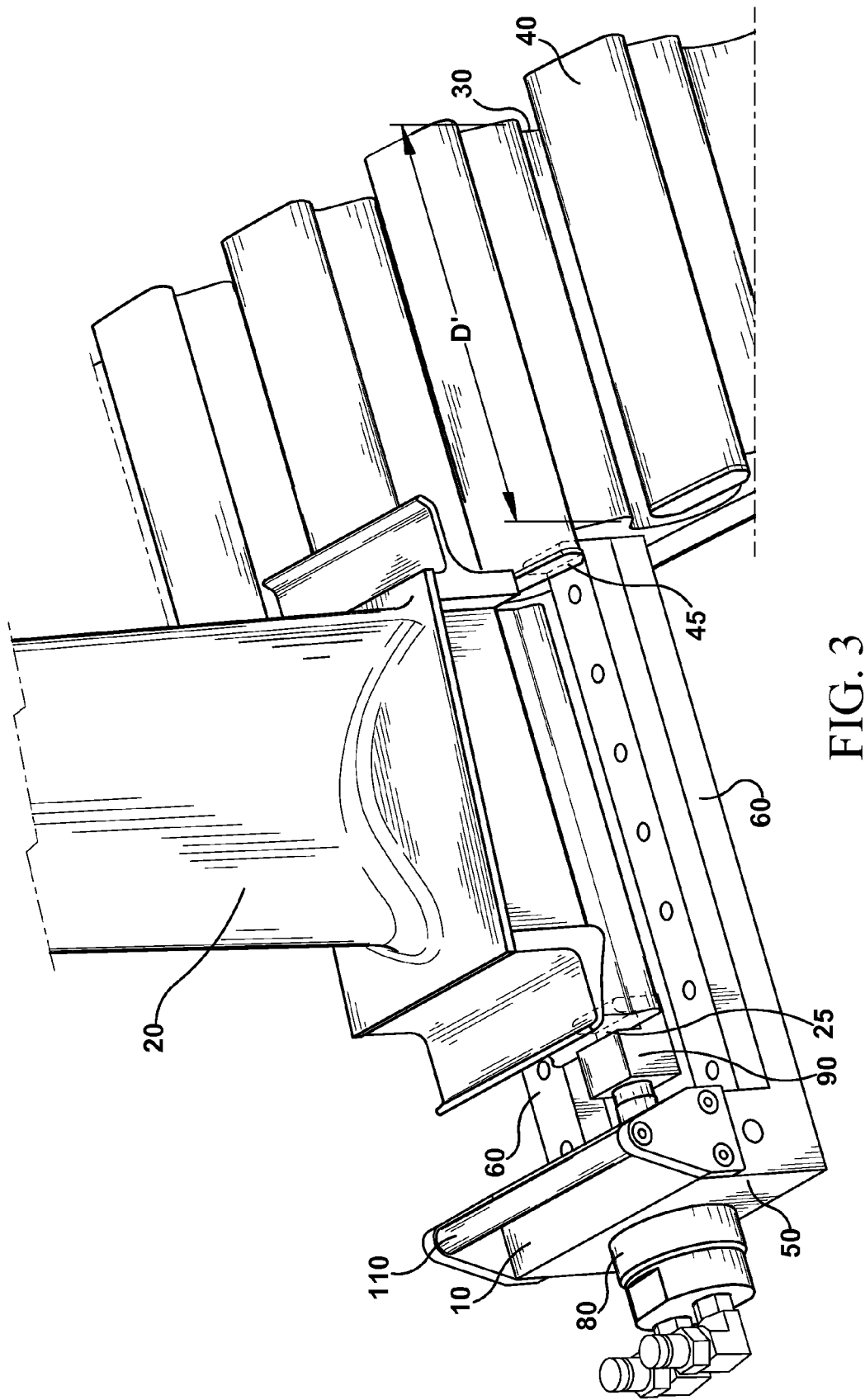
FIG. 3 illustrates a three-dimensional perspective view of an environment for use of an apparatus according to embodiments of the invention.

FIG. 3 illustrates an environment 5 where bucket 20 is displaced a distance D' from a position P within slot 30. Distance D' is equal to an axial length of a turbomachine wheel slot 30, as illustrated in FIG. 3. According to embodiments, engagement arm 90, coupled to linear actuator 80, may be adapted to be actuated in a first axial direction A by the linear actuator 80 over distance D', thereby displacing bucket 20 over distance D', equal to the axial length of turbomachine wheel slot 30.

Figure 4:
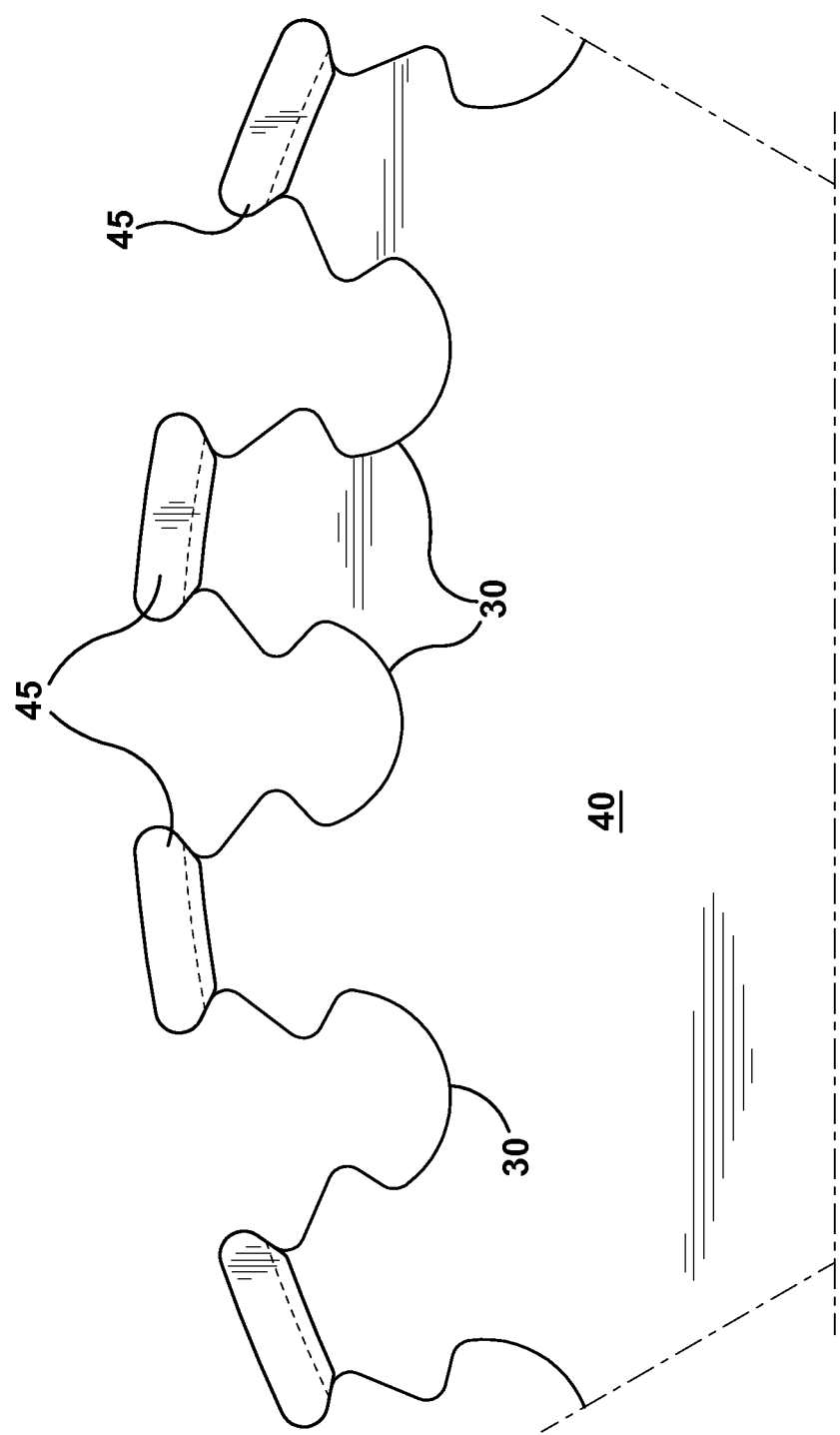
FIG. 4 illustrates a two-dimensional cross-sectional view of an environment for use of an apparatus according to embodiments of the invention.

FIG. 4 is a two dimensional view of an environment for use of apparatus 10. FIG. 4 illustrates a portion of turbomachine wheel 40 having slots 30 therein. Distance D is illustrated as a circumferential or linear distance between adjacent slots 30; distance D' may also be a distance between contacting portions 60 according to embodiments of the invention, as described above with reference to FIG. 1.

Figure 5:
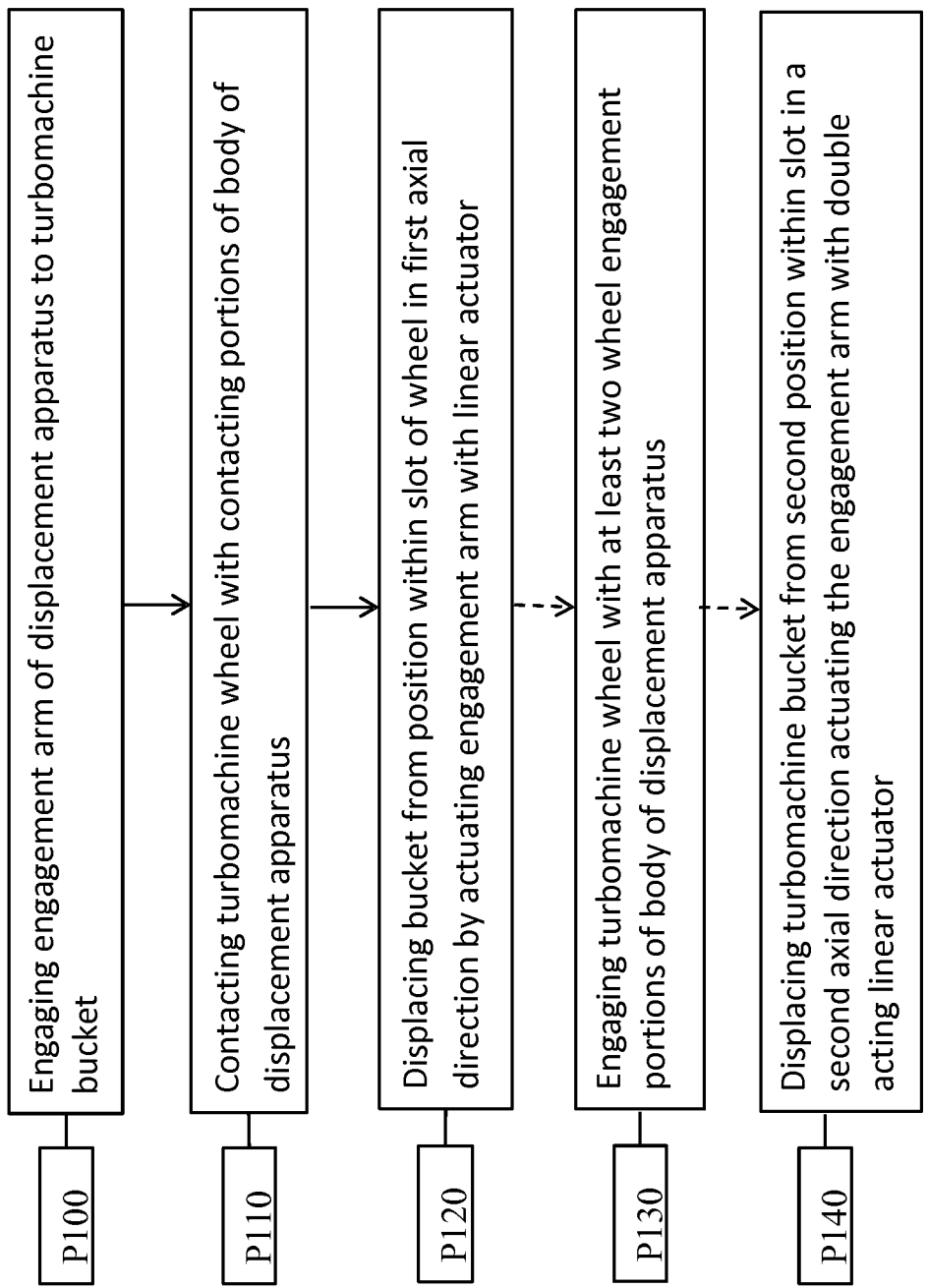
FIG. 5 shows illustrative processes that may be performed in methods according to embodiments of the invention.

FIG. 5 shows illustrative processes that may be performed in methods for displacing a gas turbomachine bucket from a turbomachine wheel slot using a displacement apparatus according to embodiments of the invention. Process P100 includes detachably engaging an engagement arm 90 of the displacement apparatus 10 to gas turbine bucket 20, the engagement arm 90 attached to a linear actuator 80 coupled to a body 50 of the displacement apparatus 10, and the engagement arm 90 adapted to be actuated in a first axial direction A by the linear actuator 80.

Process P110 includes contacting the turbomachine wheel 40 with at least two contacting portions 60 of the body 50 of the displacement apparatus 10. Contacting the wheel 40 with contacting portions 60 may be performed in order to provide a reactive force to apparatus 10 while performing a displacement operation. Process P120 includes displacing the gas turbine bucket 20 from a position P within a slot 30 of the turbomachine wheel 40 in the first axial direction A by linearly actuating the engagement arm 90 with the linear actuator 80. According to embodiments, linear actuator 80 may include single-acting or double acting linear actuator, e.g., a single- or double-acting hydraulic ram, as discussed above.

Linear actuator 80 may further include other now-known or later developed mechanisms appropriate for linearly actuating an engagement arm 90 in order to displace bucket 20.

Optional processes may be performed along with processes P100-P120 in embodiments of the invention where the linear actuator 80 is a two-way hydraulic ram for actuating the engagement arm 90 in the first axial direction A and a second axial direction A', opposite the first axial direction A. In such embodiments, the body 50 of the displacement apparatus 10 may include at least two turbomachine wheel engagement portions 100 for engaging the turbomachine wheel 40. Such optional processes may include optional processes P130 and/or P140. Optional process P130 includes engaging the turbomachine wheel 40 with the at least two turbomachine wheel engagement portions 100. Wheel engagement portions 100 may each include a hook 105 for engaging lockwire tabs 45 of the turbomachine wheel 40. Optional process P140 includes displacing the gas turbine bucket 20 from the first position P or a second position P' within the slot of the turbomachine wheel 40 in a second axial direction A', opposite the first axial direction A, by linearly actuating the engagement arm 90 with the linear actuator 80. As discussed above with reference to FIG. 1, bucket 20 may be prevented or hindered from being fully displaced a desired distance in axial direction A during a first attempted displacement operation. According to embodiments, bucket 20 may start at a first position P and be linearly actuated to a second position P', e.g. where friction hinders or prevents further axial movement in direction A. Therefore, actuating bucket 20 from the second position P' in second axial direction A' may be performed in order to allow bucket 20 to be finally displaced the desired distance in first axial direction A. FIG. 3 illustrates position P as a position of bucket 20 within slot 30 before a displacement operation is commenced. FIG. 3 further illustrates second position P' as a position where a displaced bucket 20 may be found if a displacement operation is not successful in displacing bucket 20 a distance D', equal to the axial length of slot 30, e.g., due to friction.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "axial" and/or "axially" refer to the relative position/direction of objects along axis A, which is substantially parallel with the long axis of a linear actuator. As further used herein, the terms "radial" and/or "radially" refer to the relative position/direction of objects along radius (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for displacing a turbine bucket from a turbomachine wheel slot, the apparatus comprising:
    a body having at least two contacting portions for contacting the turbomachine wheel;
    a linear actuator coupled to the body; and
    an engagement arm for engaging the turbine bucket, the engagement arm coupled to the linear actuator and adapted to be actuated in a first axial direction by the linear actuator,
    wherein the body includes at least two turbomachine wheel engagement portions each extending from one of the two contacting portions for engaging the turbomachine wheel, wherein the at least two turbomachine wheel engagement portions are spaced and adapted to engage adjacent lockwire tabs of the turbomachine wheel, wherein the at least two turbomachine wheel engagement portions each include a hook.

2. The apparatus of claim 1, wherein the linear actuator includes one of a one-way hydraulic ram or a two-way hydraulic ram.

3. The apparatus of claim 1, further comprising a handle coupled to the body.

4. The apparatus of claim 1, wherein the body includes one of aluminum, aircraft aluminum or steel.

5. An apparatus for displacing a turbine bucket from a turbomachine wheel slot, the apparatus comprising:
    a body having at least two contacting portions for contacting the turbomachine wheel, the contacting portions spaced apart at least a distance equal to a distance between the turbomachine wheel slot and an adjacent turbomachine wheel slot;
    a hydraulic ram coupled to the body; and
    an engagement arm for engaging the turbine bucket, the engagement arm coupled to the hydraulic ram and adapted to be actuated in a first axial direction by the hydraulic ram over a distance equal to at least an axial length of a turbomachine wheel slot,
    wherein the body includes at least two turbomachine wheel engagement portions for engaging the turbomachine wheel, the at least two turbomachine wheel engagement portions being spaced apart at least the distance between the turbomachine wheel slot and the adjacent turbomachine wheel slot, wherein the at least two turbomachine wheel engagement portions are spaced and adapted to engage adjacent lockwire tabs of the turbomachine wheel, wherein the at least two turbomachine wheel engagement portions each include a hook.

6. The apparatus of claim 5, wherein the hydraulic ram is one of a one-way hydraulic ram or a two-way hydraulic ram.

7. The apparatus of claim 5, further comprising a handle coupled to the body.

8. The apparatus of claim 5, wherein the body includes one of aluminum, aircraft aluminum or steel.

* * * * *